May 5, 1936.  R. DEBENEDETTI  2,039,781

FLEXIBLE METAL TUBE

Filed July 28, 1934

Inventor
R. Debenedetti
By
C. F. Wenderoth
Atty

Patented May 5, 1936

2,039,781

UNITED STATES PATENT OFFICE 2,039,781

FLEXIBLE METAL TUBE

Rodolfo Debenedetti, Turin, Italy, assignor to Chicago Tubing and Braiding Company, Maywood, Ill., a corporation of Illinois Application July 28, 1934, Serial No. 737,438
In Germany July 29, 1933

8 Claims. (Cl. 138—70)

This invention relates to flexible metal tubes consisting of uninterrupted tubular bodies whose walls are corrugated transversely to the tube axis to impart the desired flexible character to the tube.

This invention has for its object a tube of said class which consists of two or more uninterrupted tubular metal bodies located inside each other with intermediate layer or layers of soft, plastic or resilient material, as rubber, said layer or layers being if desired compressed between said metal bodies.

The tube of this invention has a large flexibility which is imparted it by the plastic or resilient layer or layers located intermediate the metal bodies and besides other features depending on its structure as its resistance to high pressures and its full tightness, it has the feature of satisfactorily withstanding vibrations, this feature on the contrary not being secured in flexible tubes consisting of corrugated tubular metal bodies.

The tube of this invention has a larger flexibility over those consisting of an equal number of metal bodies having the same thickness and made of the same metal, such improved character of this tube depending on the provision of the layer of soft, plastic or resilient material intermediate adjacent metal bodies.

In the illustrated embodiment the tube comprises a tubular metal body 1, a rubber layer 2 located on the outer surface of said body and an outer tubular metal body 3 encircling the body 1 and the layer 2 located thereon.

Figure 1:
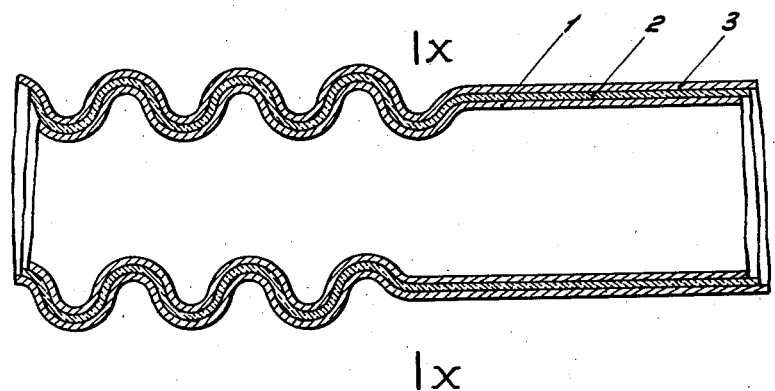
Figure 1 shows a length of a tube according to this invention, a portion of the same being illustrated in its final shape and a portion being shown in the shape it has before provision of corrugations therein.
Figure 2:
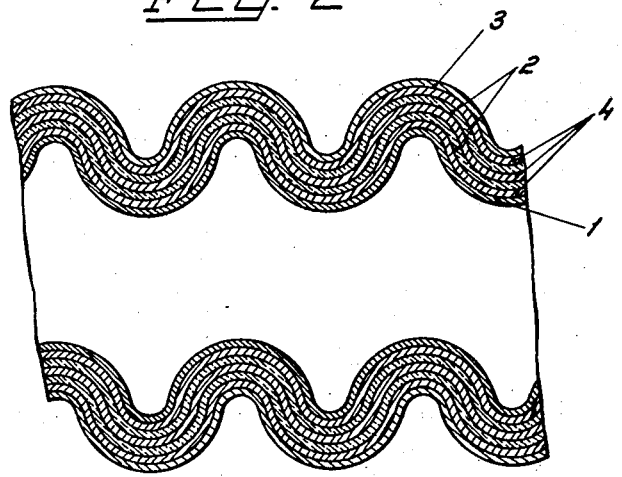
Figure 2 shows in section a fragment of a modified structure of tube.

Instead of two metal bodies 1 and 3, any larger number of tubular metal bodies may be located within each other, as shown in Figure 2, with a layer or pipe of soft or plastic or resilient material 2 inserted intermediate each tubular metal body and that or those adjacent thereto, or intermediate any preferred two of them.

The tubular metal bodies may be of any suitable metal, as iron, copper (the surface of the copper body contacting with rubber being tin-coated), copper alloys and equivalent materials; the several tubular bodies may also be made of different metals and more particularly the innermost metal body and the outermost one are conveniently made each of a metal specifically proper to withstand stresses and actions of different natures said innermost and outermost bodies are subject to.

Accordingly, as shown in Figure 2, the outermost body 3 may be made of a comparatively hard metal (as iron, copper and so on) to withstand wear, while the innermost body 1 may be conveniently made of a metal able to withstand actions which may be developed by the fluid the tube is intended for; by way of example said innermost tubular body may be made of lead in tubes intended to convey acids. Other metal bodies as 4 may be located between bodies 1 and 3 and rubber layers 2 are located intermediate preferred one of them.

To provide the blank from which the tube is thereafter obtained, metal tube sections each having a suitable diameter and the desired tube section or sections of soft or plastic or resilient material as rubber may be located within each other; it is also possible to provide a layer of soft or plastic or resilient material as rubber in any suitable manner on the outer surface or on the internal one of one or more metal tube sections and then to insert such metal tube sections within each other.

The soft, plastic or resilient pipes or layers, when consisting of rubber, may be cured before the assembly of the several sections providing the completed tube, but in the preferred embodiment of this invention they are in uncured state at the time the composite blank is prepared and they are cured after the final shape has been imparted to the tube.

Said pipes or linings of soft or plastic or resilient material or rubber may have such a thickness as to be compressed intermediate the metal bodies encircling them.

Whatever is the manner the cylindrical composite blank is obtained in the shape illustrated at the right of line X—X on the drawing, said blank is then corrugated transversely by providing in it annular corrugations or grooves or a helicoidal corrugation or groove by any of the known methods of common use in the manufacture of corrugated tubes.

After said corrugating operation the intermediate layer or layers of rubber is or are cured when uncured rubber has been used in the provision of the blank, as above suggested.

Thus the completed tube as illustrated in the left half portion of the figure of the drawing is obtained.

In the completed tube the metal tubular sections are not in direct contact with each other, but on the contrary they are separated by a plastic or resilient layer which may also be in compressed condition, this feature assisting the capacity of adjacent portions of the several metal bodies to move with respect to each other and therefore improving the flexibility of the completed tube.

In the tube of this invention the propagation of vibrations is also prevented, such vibrations being materially detrimental to the life of usual metal tubes which have been deformed to provide corrugations therein.

On the other hand, the tube of this invention may withstand very high pressures and it is absolutely tight, this feature causing the soft, plastic or resilient material located intermediate the metal sections to be fully protected against the fluid which flows through the tube.

Finally, the advantage is secured that any leakage is prevented even if cracks or flaws develop in one or more of the metal bodies, because the soft, plastic or resilient material acts to automatically fill or obstruct said cracks or flaws, particularly when said material is in compressed condition intermediate said metal bodies, as above suggested.

What I claim as my invention and desire to secure by United States Letters Patent is:—

1. A flexible metal tube comprising uninterrupted thin metal tubular bodies located within each other and provided with registering corrugations transversely to the tube axis and a thin layer of soft material intermediate said bodies.

2. A flexible metal tube comprising uninterrupted thin metal tubular bodies located within each other and provided with registering corrugations transversely to the tube axis and a thin layer of soft material intermediate two adjacent ones of said bodies.

3. A flexible metal tube comprising uninterrupted thin metal tubular bodies located within each other and provided with registering corrugations transversely to the tube axis and a thin layer of rubber intermediate said bodies.

4. A flexible metal tube comprising uninterrupted thin metal tubular bodies located within each other and provided with registering corrugations transversely to the tube axis and a thin layer of rubber intermediate two adjacent ones of said bodies.

5. A flexible metal tube comprising uninterrupted thin metal tubular bodies located within each other and provided with registering corrugations transversely to the tube axis, and a thin layer of rubber in compressed condition between said bodies.

6. A flexible metal tube comprising two uninterrupted thin metal tubular bodies located within each other and provided with registering corrugations transversely to the tube axis and a thin layer of rubber fitted between said tubular bodies.

7. A flexible metal tube comprising uninterrupted tubular metal bodies located within one another and provided with registering corrugations and a continuous layer of plastic material located intermediate said bodies.

8. A flexible metal tube comprising uninterrupted metal tubular bodies located within one another and provided with registering corrugations transversely to the tube axis and a continuous layer of plastic material located intermediate two adjacent ones of said bodies.

RODOLFO DEBENEDETTI.